UNITED STATES PATENT OFFICE.

GEORGE F. SMITH, OF COVINGTON, VIRGINIA.

PAINT COMPOUND.

992,609.  Specification of Letters Patent.  Patented May 16, 1911.

No Drawing.  Application filed December 18, 1908.  Serial No. 468,137.

*To all whom it may concern:*

Be it known that I, GEORGE F. SMITH, a citizen of the United States, residing at Covington, in the county of Alleghany and State of Virginia, have invented new and useful Improvements in Paint Compounds, of which the following is a specification.

This invention relates to an improved paint compound for use in painting metallic and other surfaces.

The improved paint consists of asphaltum (of commerce) and cymene oil—a sulfite pulp residue of the terpene class, differing from turpentine in being materially less volatile and more highly adhesive.

In the manufacture of the improved paint compound, a sufficient amount of the cymene oil is combined with the asphaltum, by stirring or agitation, to reduce the compound to the required consistency for use, the resultant compound being readily and cheaply produced, very brilliant and exceedingly durable.

Owing to the fact that the cymene oil is less volatile than turpentine and the other solvents commonly used, less danger in keeping the compound in storage results, and the compound may be kept for a much longer period of time without deterioration from the evaporation of the solvent. Furthermore, the highly adhesive quality of the cymene oil makes the paint compound much more tenacious than asphalt paints made with any of the ordinary solvents.

Having thus described my invention, I claim:—

A paint compound comprising asphaltum and crude cymene oil.

In testimony whereof I affix my signature in presence of two witnesses.

GEORGE F. SMITH.

Witnesses:
C. H. REINSCOMB,
H. H. PARKER.